Jan. 29, 1963  R. J. CIEJKA ET AL  3,075,277
MACHINE TOOL ATTACHMENT
Filed April 19, 1960  3 Sheets-Sheet 3
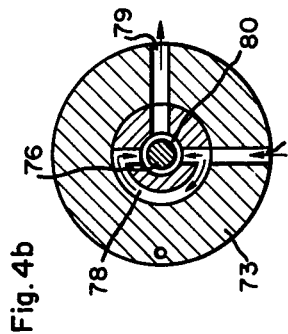
Fig. 4b
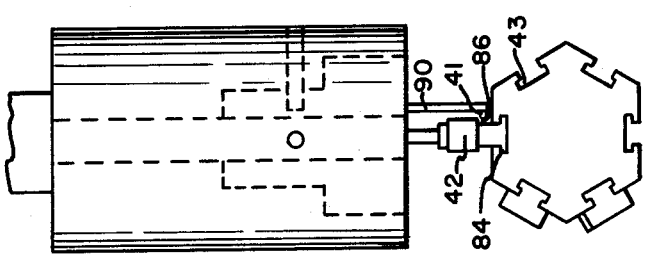
Fig. 6a
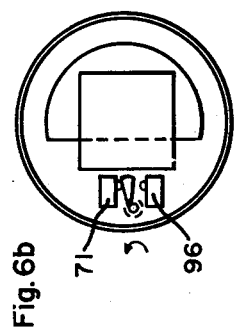
Fig. 6b
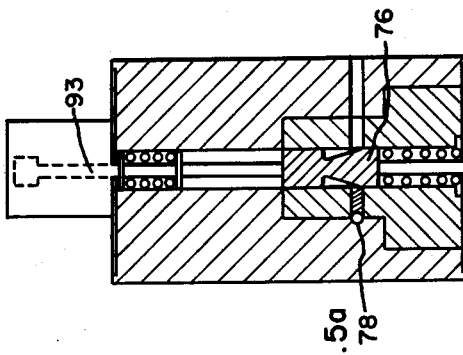
Fig. 5a
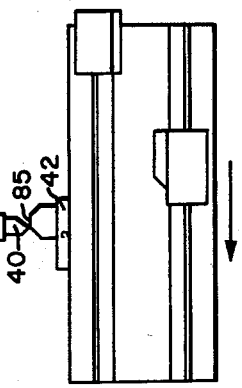
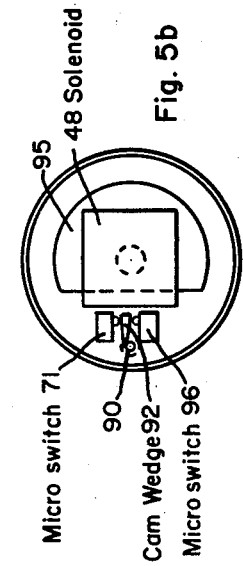
Fig. 5b
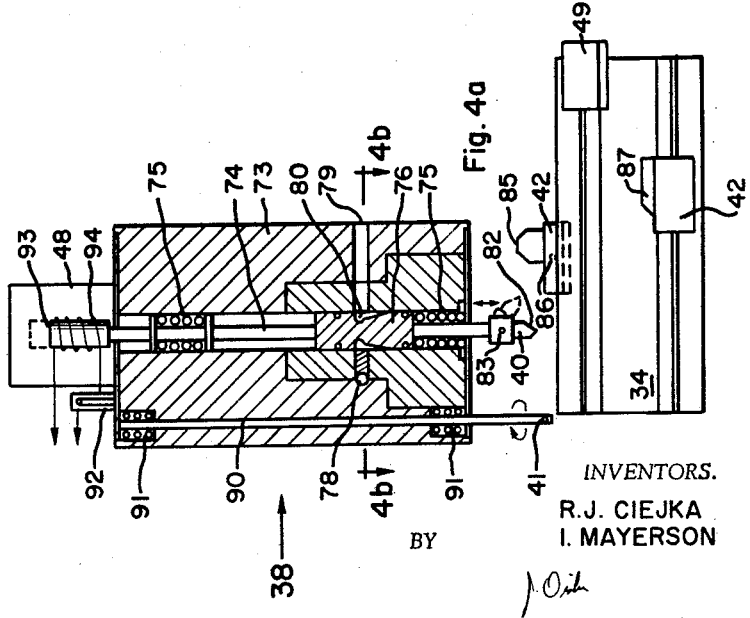
Fig. 4a
INVENTORS.
R.J. CIEJKA
I. MAYERSON
BY
ATTORNEY

United States Patent Office 3,075,277
Patented Jan. 29, 1963

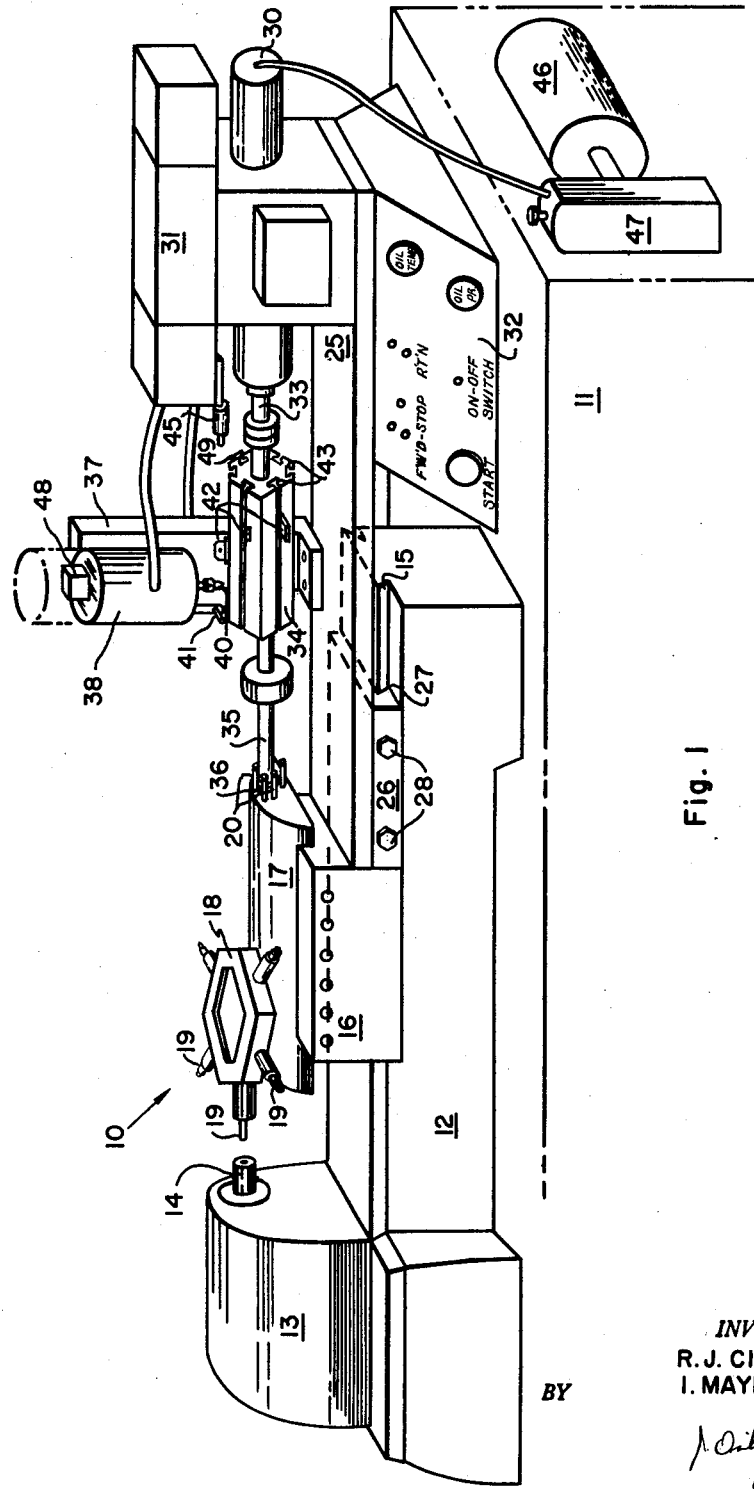

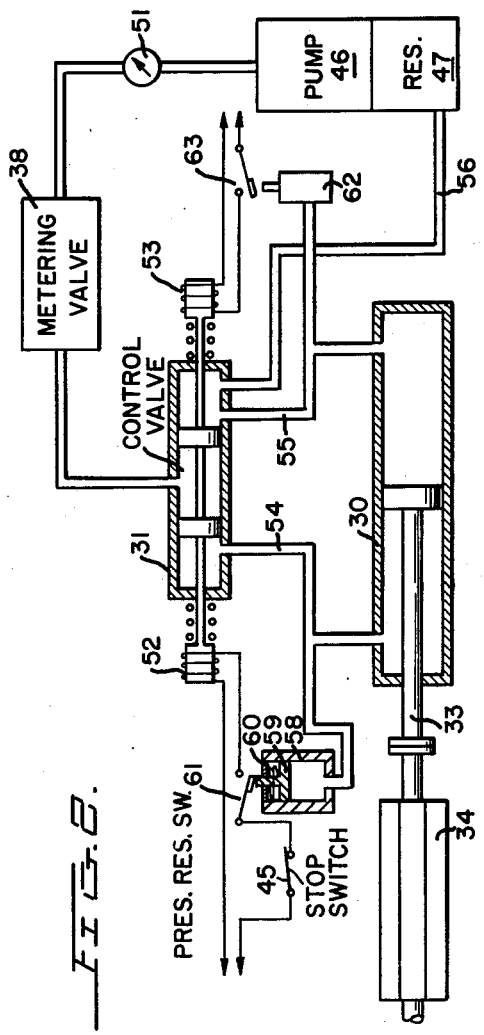
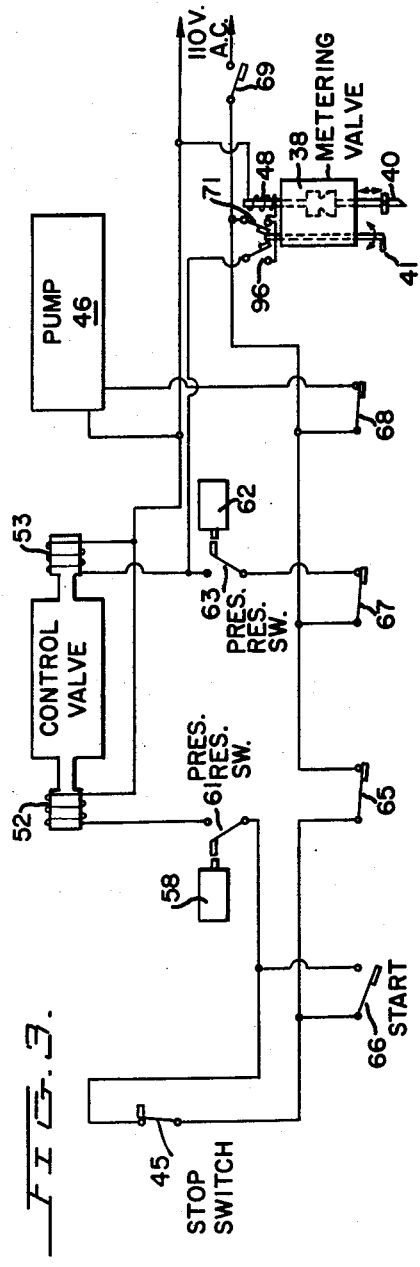

3,075,277
MACHINE TOOL ATTACHMENT
Rudolph J. Ciejka, Bronx, and Israel Mayerson, Whitestone, N.Y., assignors to O.K. Machine and Tool Corporation, New York, N.Y., a corporation of New York
Filed Apr. 19, 1960, Ser. No. 23,320
17 Claims. (Cl. 29—42)

This invention relates to an attachment for automating a machine tool. Specifically, the invention relates to a hydraulically-operating attachment for automating a turret lathe.

Present precision turret lathes, such as the well-known Hardinge lathe, contain a mechanically-indexing turret supporting the usual six or less tools. When the operator, during his manual advance and return of the turret carriage, reaches the end of the return stroke, the turret head indexes automatically and a new tool is swung into position for operating on the work-piece. The main disadvantage of such a lathe, which is primarily a production tool, especially in a small tool shop, is its limited speed and production rate, which is attributable to the operator who must manually reciprocate the turret. For fastest operation, the stroke should be rapid while returning the turret from the work-piece or advancing it toward the work-piece—in general, whenever the tool is not engaging the work-piece—whereas the feed should be slower and at a selected rate when the different tools actually engage the work-piece. To attain high production rates with such a machine tool requires industrious, skilled operators able to effect these sudden speed changes accurately and at the proper times and throughout an entire day's work. Moreover, the different tool operations require different feed rates, and so the operator must take great care to employ the correct feed else the work-piece may not satisfy its specifications. Only highly-skilled operators at relatively low rates of production have been able to satisfactorily operate such a machine.

Thus there is a need in the art for an attachment that can be added to an existing, manually-operable, turret lathe that is capable of automatically performing at high speeds at least some of the functions originally required of the operator, with the consequence that much higher production rates will be possible with the same machine and, in most cases, even better or more precise work. The object of the invention is to provide such an attachment for turret-type machine tools that fulfills the following requirements: (1) it should be portable, so that the same attachment can be used on more than one machine depending on production requirements. This will also require simple, readily-detachable connections to the machine tool. This is especially important for the small shop whose capital expenditures for equipment are limited; (2) it should be inexpensive, both as to original cost and maintenance. This requires few, simple, and uncomplicated though rugged elements capable of long-life with little wear and easy replacement; (3) the attachment should have sufficient flexibility so that it may perform the many jobs required of it in the usual shop. For example, the forward advance should be rapid to the point where the tool is about to engage the work. Next, a smooth slow feed whose rate is controllable is needed while the tool engages the work-piece. Finally, the tool return should be controlled to be rapid immediately, or slowly first and then rapidly. For example, after a drilling operation has terminated, the tool can be returned as rapidly as possible to its starting position. However, with a boring operation, the return stroke must be slow while the tool retraverses the work-piece, and then may be rapid after the work-piece is cleared. Otherwise, the work may be scored and its finish impaired by a rapidly-returning boring tool; (4) the various feed rates should be easily adjustable by preferably unskilled operators for each different tool position on the turret; (5) finally, the automatic operation should not be obtainable at the sacrifice of accuracy. The automated machine tool should be capable of performing the same operations as could be performed by the original manual machine and with at least the same accuracy.

These and other objects of the invention are attained with the automating construction of the invention. Briefly speaking, the latter comprises a hydraulic system for advancing and returning the tool turret. The hydraulic system employs a single fluid-pressure-establishing means, a fluid-actuated cylinder, and a directional valve for feeding the fluid to the cylinder to control the direction of its motion. To control the fluid pressure applied to the cylinder, which controls its feed rate, a single metering valve in series in the hydraulic circuit is employed. The metering valve includes a novel spool and cylinder construction whereby a condition of reduced fluid flow once established is maintained. The different pressure conditions of the metering valve are selected and controlled by dogs mounted on an indexable control drum movable with the tool turret. Each dog not only determines when the rapid advance of the tool is converted to a slow feed, but also determines at which point in the return stroke a high-pressure condition will be restored and the tool turret thus rapidly returned to its starting position. By proper shaping and construction of the dogs, as well as proper positioning on the control drum, any desired sequence of feed rates may be obtained automatically and reproducibly.

The invention will now be described in greater detail with reference to the accompanying drawing, in which:

FIG. 1 is a perspective view of the automating attachment of the invention mounted in position on a turret lathe;

FIG. 2 is a diagrammatic view of the hydraulic circuit of the inventive attachment;

FIG. 3 is a diagrammatic view of the electrical circuitry of the attachment of the invention;

FIG. 4a is an elevational, partly cross-sectional view of the metering valve in the high-pressure condition with the top cover removed;

FIG. 4b is a cross-sectional view of the valve in FIG. 4a along the line 4b—4b;

FIG. 5a is a view similar to FIG. 4a showing the valve in its low-pressure condition;

FIG. 5b is a top view of the valve showing the pivoting action of the spool-returning mechanism;

FIG. 6a is an elevational view of the valve at right angles to the view of FIG. 4a showing actuation of the spool-restoring mechanism;

FIG. 6b is a top view of the valve of FIG. 6a showing the solenoid actuated.

Referring now to the drawing, FIG. 1 is a perspective view of the automating attachment of the invention mounted in operating position on the bed of a turret lathe. The lathe, referred to generally by reference numeral 10, comprises the usual cabinet support 11 on which the lathe bed 12 is mounted. At the left end of the lathe is the fixed headstock 13 containing the usual rotary, work-piece-supporting chuck or collet 14. A tool-turret-support 16 is mounted on dovetail ways 15 of the bed 12. On the support 16 is the turret carriage 17 which is reciprocated forward and backward. On the carriage 17 is mounted an indexing turret 18 carrying a plurality of tools 19, usually six in number, on its faces. As is well-known in the art, at the end of the return stroke of a tool 19, the turret head automatically indexes to the next tool position. The indexing mechanism is built into the carriage 17 and brought into play each time the return stroke is completed.

All the operator need do is manually reciprocate the carriage 17 in the usual way. The manual means for performing this task and the other conventional mechanisms of the turret lathe are not shown for the sake of simplicity. Separate stops are provided for limiting the return movement of the carriage for each of the tool positions. These are shown at 20 as adjustable bolts. So far, what has been described is well-known in the art to facilitate the description of the invention.

The automating attachment of the invention is shown on the right of FIG. 1. It comprises a supporting plate 25 whose left end is secured to a mounting member 26 with a dovetailed joint 27 for direct engagement with the dovetailed ways 15 of the lathe bed 12. The mounting plate 26 abuts against the fixed carriage support 16 and is secured in position by means of bolts 28. On the right end of the support 25 is mounted a 2-way hydraulic cylinder 30 whose motion is controlled by a conventional double-solenoid, directional control valve 31, which functions to supply fluid under pressure to opposite ends of the cylinder 30 to reciprocate its piston 33 in accordance with the energization of the valve 31 solenoids. For clarification purposes, the various operating controls, gauges and indicators are shown in a control panel 32 located beneath the support 25, though in actual practice the units on the right would be enveloped in a suitable housing (not shown) and the various controls, gauges and indicators built directly into the housing wall. To the movable piston 33 of the cylinder 30 is coupled a control drum 34, which in turn is coupled via a drive rod 35 directly to the rear of the turret carriage 17. If not already provided thereon by the lathe manufacturer, a threaded coupling 36 should be added to the carriage rear for coupling to the rod 35. It will be noted that only two mechanical connections have been made to the original, manual, turret lathe. First, the mounting plate 26 has been mounted on the lathe bed 12. Secondly, the drive rod 35 has been coupled by way of a simple, easily detachable, threaded coupling 36 to the rear of the turret carriage 17. As will be evident, reciprocation of the piston 33 causes equal reciprocation of the control drum 34 and the turret carriage 17, as all three elements are directly linked together and in line with one another. An L-shaped support 37 mounted on the support plate 25 supports a metering valve 38 over the control drum 34. The metering valve 38 contains a spool member (not shown in FIG. 1) driven by a first follower 40. The valve 38 also contains a spool-restoring device including a second follower 41. Both of the followers 40 and 41 are actuated by dogs 42 mounted in inverted T-shaped slots 43 which extend in the longitudinal direction on the six faces of the hexagonal drum 34. The control drum 34 has faces equal in number to the number of tool positions on the turret. Mounted on the valve 31 so as to be actuated by a dog 49 on drum 34 is a stop switch 45, which may be a microswitch, which deenergizes the device when actuated. Finally, for suitable operation, the system requires a source of fluid pressure, shown as an oil pump 46 coupled to a suitable oil reservoir 47. For long-term operation on the same machine, the pump 46 and reservoir 47 may be mounted directly on the lathe support cabinet 11. For increased portability, the pump and reservoir may be mounted on a wheeled carriage which is readily conveyed from machine to machine. Flexible oil couplings can be employed to couple the pump and reservoir to the remainder of the system.

The normal starting position of the machine is with the tool carriage 17 all the way to the right and with the first tool in position for engaging the work. Assuming that the pump 46 has established the desired oil pressure in the system, which may be of the order of 300 p.s.i., the operator depresses the start button on the control panel and operation of the machine is initiated. The electrical circuit is arranged, as will be later shown, so that depression of the start button energizes the forward solenoid of the directional valve 31 such that oil under pressure enters the right end of the cylinder 30. This action drives the tool carriage 17 toward the rotating work-piece at high speed constituting the rapid advance phase of the forward stroke. Just before the work-piece is engaged, a suitably positioned cam 42, having been moved forward with the drum 34, engages with its upper cam portion the follower 40 moving it, and the internal spool of the metering valve 38 to which it is attached, upward. As the metering valve is in series in the hydraulic circuit, this action reduces the fluid flow and thus the fluid pressure at the cylinder 30, with the consequence that the rate of advance is markedly reduced and thus the slow feed phase of the forward stroke is initiated. The dog 42 will pass completely under the follower 40 and so will no longer support its upward position, but, by means which will be later explained, the spool member maintains its position of reduced pressure and the slow feed continues. Next, a side cam portion of the same dog 42 will engage the succeeding follower 41 which, because of its construction (FIG. 4a), will merely be pivoted or rotated about a vertical axis by the dog 42 until the latter has passed it by, after which due to spring biasing of a microswitch (FIG. 5b), it will pivot back to its original position. This movement of the follower 41 does not bring about any further reactions in the machine. At this point, it should be observed that the drawing of FIG. 1 is not to scale. Obviously the spacing between the tool 19 and the chuck 14 should be much wider, in fact of the order of the length of the drum. However, for greater clarity, the illustration of the attachment of the invention has been expanded relative to that of the lathe itself.

When the carriage 17 reaches the end of its forward stroke, further forward movement is blocked, but the hydraulic system still attempts to force the carriage forward. The consequence of this is for the back pressure in the cylinder to suddenly build up, and a pressure-responsive device, not shown in FIG. 1, actuates a microswitch, which in turn energizes the other or return solenoid of the directional valve 31 directing the flow of oil at reduced pressure to the left end of the cylinder 30. This action reverses the motion of the carriage 17 and the return stroke is initiated. On the return stroke, the backward-moving dog 42 again engages with its side cam portion the follower 41, which pivots it in the opposite direction. This time, however, a microswitch is actuated, which in turn energizes a solenoid 48 (FIG. 4a) located on top of the metering valve 38 and whose armature is directly linked with the spool of the valve. This action drives the spool downward to its bottom or initial position, thereby restoring full fluid pressure in the system. The result is rapidly to return the carriage 17 to its starting position. In the process, the backward-driven dog 42 again engages with its top cam surface the follower 40, but this time nothing happens, because the follower 40 is pivoted about a horizontal axis and constructed to pivot upward and out of the way when actuated from the left side. Thus, it will be observed that on the forward stroke, the first spool-actuating follower 40 is actuated by the dog 42, but the second spool-return follower 41 is not; whereas on the return stroke, the spool-return follower 41 is actuated but the first follower 40 is not. When the carriage 17 reaches the rear limit to its motion, again back-pressure built up in the left cylinder actuates a microswitch which in turn energizes the forward solenoid of the directional valve 31 again reversing the motion of the carriage and driving it forward to repeat the cycle. During this process, as explained earlier, the built-in indexing mechanism of the carriage has gone into operation swinging the second tool into operating position. Now, this indexing motion causes the coupling 36 to rotate ⅙ of a revolution. This action is built into all conventional turret heads by the lathe manufacturer. Thus, the rod 35 and the drum 34, which are rigidly linked thereto, also are rotated ⅙ of a revolution, which then brings into operating position the adjacent dog 42 on the next face of the drum. This dog now controls the cycle for the second tool operation. It will thus be evident that each of the tool operations can be individually controlled by one or more dogs mounted on a face of the control drum. The position and construction of the dog determines when the slow feed and rapid return phases of the cycle are initiated, and the height of the dog determines the slow feed rate. The dogs will generally be of a fixed construction for a particular machine operation, and can be mounted at preselected positions on the drum. However, the lathe is easily set up by even an unskilled operator for automatic operation by hand adjustment of the dogs in the drum slots to match the particular machine operation. Of course, the dogs are rigidly secured in the drum slots during operation.

The cycle is complete when all six tools have been advanced to and returned from the work-piece. If only four machine operations are needed, the last two tool positions are left empty, and the corresponding dogs omitted. Thus, the advance and return strokes of the carriage are made under conditions of high pressure and thus very quickly, so little time is lost in these useless strokes. To terminate the cycle, a stop dog 49 is mounted at the rear of the drum 34 in the sixth face. This dog 49, on the last return stroke, will engage the stop switch 45 which opens the energizing circuit for the forward solenoid of the directional valve 31. This particular type of valve 31 has no spring centering mechanism; thus, when both solenoids are deenergized the fluid pressure is always directed to the last cylinder connection, and when one solenoid remains deenergized, operation of the machine will continue until the point in the cycle when the deenergized solenoid should have become energized, at which time the machine will become locked at its last position. Hence, the piston 33 of the cylinder 30 stops in its rear position. The work-piece can now be removed, replaced by another, and the cycle repeated by redepressing the start button. It will also be noted that a stop dog 49 can be located on any of the faces of the drum 34 to halt the machine anytime during the cycle.

FIG. 2 is a flow diagram of the hydraulic system. Corresponding elements in this figure and in FIG. 1 bear the same reference numerals. The pump 46 and reservoir 47 are shown on the right. The high-pressure line from the pump 46, whose pressure is measured by a gauge 51, goes directly to the metering valve 38, which controls the pressure in the system. The outlet of the valve 38 is coupled to the directional valve 31, which is a commercially-available element. As shown schematically, the valve 31 comprises a left, forward solenoid 52 and a right, return solenoid 53 which actuate a common piston system, whose internal structure is not shown and which controls whether the fluid exits via a left line 54 or a right line 55. A return line for the system is shown schematically at 56. When solenoid 53 is energized, the fluid exists via the line 54 entering the left end of the cylinder 30. This causes the tool-driving piston 33 with its attached drum 34 to carry out its return stroke. When the return stroke has been stopped, back pressure builds up in the line 54 actuating a pressure-responsive device 58.

The pressure-responsive device 58 is of conventional construction and comprises a fluid-driven piston 59 which moves against the action of a biasing spring 60. When the back fluid pressure exceeds the spring pressure, the piston moves upwardly actuating a microswitch 61 whose normally-open contacts are closed completing the circuit to the solenoid 52 and energizing it. This closes the exit line 54 from the valve 31 and opens the exit line 55, thereby leading fluid into the right end of the cylinder 30 and driving the drum 34 and carriage 17 on its forward stroke. As the solenoid energizing circuit requires a certain closed time interval before the directional valve 31 performs its intended function, the microswitch 61 preferably has incorporated into it a delay mechanism for holding its contacts closed the required time interval, else the initial action of the valve 31 drops the back pressure and opens the solenoid circuit. The same result can be accomplished by employing an intervening relay circuit between the solenoid 52 and the microswitch 61. In such event, the microswitch 61 will close the relay circuit, and the energized relay will close its contacts, one pair of which will maintain the energization of the relay winding for a certain time interval, and the other pair of which will close the solenoid 52 circuit.

Similarly, when the forward stroke has ceased, the back pressure in the line 55 actuates a similar pressure-responsive device 62 which in turn actuates a similar microswitch 63 to reenergize the solenoid 53, which then brings about the return stroke of the carriage. On the last return stroke of the complete cycle of six, the stop switch 45 is actuated by a dog on the drum 34. This switch 45 contains normally-closed contacts in the forward-solenoid 52 energizing circuit. Actuation of the switch 45 opens its contacts, thereby preventing further energization of the forward solenoid 52. Thus, the directional valve 31 becomes inoperable and the piston 33 remains locked in its rear position.

The electrical circuit shown in FIG. 3 also illustrates this operation. The power comes in on the right from the line and goes straight to the circuit on the left, which includes a series-connected manual stop switch 65 for the return position, a parallel-connected start-cycle switch 66, the normally-closed stop switch 45, a pressure-responsive switch 58—61, and the forward solenoid 52. Whenever the solenoid 52 is energized, the tool carriage carries out its forward stroke. Also, on the return stroke, if the solenoid 52 fails to become energized, the machine will stop with the carriage in its rear position. The start-cycle switch 66 is normally-open, but becomes temporarily closed when operator-actuated, so that if the manual stop 65 is closed, and the piston 33 is in the rear position with back pressure energizing the pressure-responsive device 58 and closing the switch 61, the solenoid 52 becomes energized even though the stop switch 45 has opened its normally-closed contacts. This is how the cycle is initiated. As soon as the drum 34 moves forward, the stop switch 45 becomes deenergized and its contacts close thus bypassing the start-cycle switch 66. Thereafter, the microswitch contacts 61 control energizing of the forward solenoid 52. To stop the machine during the cycle with the carriage in the rear position, the stop switch 65, which may be a toggle switch, is thrown to the open position, which prevents energization of the solenoid 52. The circuit for the return solenoid 53 is similar, containing a microswitch 63 actuated by its pressure-responsive device 62, and a forward manual stop switch 67, which may be a toggle switch, and when opened prevents energization of the return solenoid 53 thus stopping the machine at the end of its forward stroke. The switch 68 leading to the pump 46 is merely an overload-protection switch whose contacts are normally closed. An on-off switch 69 provides power for the system. When that is thrown, fluid pressure is established in the system.

Continuing with FIG. 3, a solenoid 48 is also present in the metering valve 38, and, as explained earlier, when energized, drives the spool and follower 40 downward restoring full pressure in the system. The spool-restoring solenoid 48 is normally energized when the normally-open contacts of a microswitch 71 are closed, which occurs when the spool-return follower 41 is dog-actuated on the return stroke of the drum 34. To understand this better, reference is had to FIGS. 4 to 6 which illustrate in more detail the construction of the metering valve, an important feature of the invention, and the manner of its operation.

FIG. 4a is a cross-sectional view of the metering valve 38 showing its internal construction. It comprises a vertically-journalled member 74 mounted between bearings 75 at opposite ends to permit ready upward motion. In the absence of fluid pressure, the member 74 is freely movable in a vertical direction and is not constrained in any manner except for stops at opposite ends. Mounted approximately at the center of the member 74 is a spool 76. In the front of the housing 73 of the valve surrounding the spool 76 is an inlet port 77 (see FIG. 4b) for fluid under pressure to enter the valve and impinge on the spool 76. An internal channel 78 brings the incoming fluid to the opposite side of the spool 76, so that the same high fluid pressure is maintained at diametrically opposed surface portions of the spool 76. An exit port 79 is located on the side of the housing facing the channel 78. For fluid to reach the exit port 79, it must flow between the sides of the spool 76 and the surrounding housing, shown at 80 in FIGS. 4a and 4b, and, as will be noted, since the active surface of the spool, is tapered (about 2° taper), as the spool moves upwardly, so is the passageway to the exit port 79 more and more constricted to thereby reduce the exiting fluid flow. With the spool in the position shown in FIG. 4a, the full fluid pressure is transmitted to the exit port. As the spool member moves upwardly, the connecting passageway is gradually choked off by the outwardly tapering spool shape. However, the flow is never completely terminated, because, as the metering valve is in series in the hydraulic circuit, some flow must always be maintained to keep the circuit operative. Thus in the full-up position of the spool, some fluid will trickle out of the exit port.

The follower 40 which actuates the spool 76 on the forward stroke is directly coupled thereto and comprises a dog-engaging surface 82. The follower 40 is pivotable about a horizontal pin 83 in such manner that it pivots in the plane of the drawing of FIG. 4a but only to the right, as shown in phantom. The control drum 34 is shown underneath with several dogs 42, 49 in operating position. Each dog 42 comprises a mounting portion 84 (see FIG. 6a) for mounting in the drum slots 43, and which may be secured therein by set screws (not shown), an upper cam surface 85 for actuating the follower 40 on the forward stroke, and a side cam surface 86, 87 for actuating the follower 41. The cam 42 is positioned in the drum such that its upper cam surface engages the follower 40 on the forward stroke just before the tool engages the work-piece, thereby initiating the slow feed phase. The height of the cam surface 85 determines the slow feed rate. FIG. 5a shows the cam surface 85 engaging the follower 40 and moving the spool 76 upwardly to reduce the fluid pressure. As the forward stroke continues, the dog 42 passes completely underneath the follower 40, but the spool does not fall downwardly, because it was found that the application of the fluid to diametrically opposed surface portions of the spool 76 via the internal channel 78 established equal pressures thereat and maintained the spool in the position to which it had been moved by the dog 42 without any holding members being necessary. While holding members could be provided if desired, an advantage of the pressure-locking or holding construction described is the possible stepless variation of the spool positions. This makes possible an infinite number of feed rates between the high speed advance rate and one reduced almost to zero, thereby enabling practically any machine operation to be carried out in the optimum manner.

The spool-restoring mechanism comprises a vertical rod 90 journalled 91 in the housing for rotary or pivotal movement about its longitudinal axis. The follower portion at the bottom has been referred to earlier by numeral 41 and comprises a pin which extends in a horizonal direction out of the plane of the drawing of FIG. 4a (see also the side view of FIG. 6a). The rod 90 is mounted behind the follower 40 so as to remain clear of the upper cam 85, but also extends below the follower 40 to engage the lower side cam surface 86 of the dog. This side cam member 86 may be a pin or other straight protuberance capable of engaging and pivoting the follower 41.

On the upper end of the rod 90 is mounted a metal wedge 92 which extends in a horizontal plane. Seated on top of the housing 73 is the spool-restoring solenoid 48 comprising an armature 93 which is coupled to the spool support 74, and a coil 94. The solenoid has an anchor plate 95 for mounting purposes. On opposite sides of the rotatable wedge 92 are mounted two internally spring-biased microswitches 71 and 96 (see FIG. 3). As will be obvious from FIG. 5b, when the rod 90 is rotated counterclockwise, the wedge 92 engages and actuates the microswitch 71 (see FIG. 6b), which closes its normally-open contacts and energizes the solenoid 48. Energization of the latter pulls the armature 93 inward and drives the spool downward to its bottom or full-pressure position, where it is maintained by equal pressure on its opposite sides. As previously noted, during the forward stroke, the side cam 86 pivots the follower to the left in FIG. 4a, rotating the rod 90 clockwise in FIG. 5b. When this is done, the microswitch 96 is actuated, closing its contacts. However, as seen in the circuit of FIG. 3, nothing will happen during the forward stroke, because the circuit will not be complete until the microswitch 63 is actuated by the pressure-responsive device 62 at the end of the forward stroke. Therefore, the solenoid 48 is not energized unless the follower 41 is maintained in its clockwise position when the forward stroke ends. During the return stroke, the follower 41 is pivoted to the right of FIG. 4a and thus counterclockwise in FIG. 5b actuating the microswitch 71. The location of the side cam 86 on the dog 42 determines at what point in the return stroke the spool-return mechanism is actuated initiating the rapid return phase. For a boring or similar operation, where the tool must return slowly until the work-piece is cleared to prevent scoring, a side cam 86 in the shape of a pin is satisfactory. In operation, the pin 86 engages the follower 41 at a predetermined, intermediate point on the return stroke. For a drilling operation, where the rapid return can be initiated at the beginning of the return stroke, a side cam in the form of a cam wedge 87 is more suitable. In this operation, on the forward stroke, the pin follower 41 is engaged by the cam 87, rotating it clockwise and actuating the microswitch 96. The wedge 87 is positioned so that the follower 41 is still engaged and in its clockwise position when the forward stroke terminates. As soon as that occurs, the pressure-responsive device 62 is energized, actuating switch 63 and thus immediately closing the circuit and actuating the spool-restoring solenoid 48. Thus, the entire return stroke is carried out at high speed. The spring biasing provided by the strip contacts of the conventional microswitches 71 and 96 maintains the wedge 92, and thus the follower 41, in a center position. FIG. 4a also shows the stop dog 49 positioned at the rear of the drum 34 for actuating the stop switch 45.

It will be realized from the foregoing description that the objects of the invention have been attained by the construction of the invention. In particular, the attachment is of relatively simple, though rugged, construction. It is inexpensive to build and requires practically no maintenance. Despite the simplicity afforded by a single pump and operating pressure, and a single metering valve in series in the hydraulic circuit, an astonishing degree of flexibility of operation is possible with the inventive construction. Infinitely variable feed rates are available for each of the tool positions. Also, rapid advance and return of the tool is available. Further, the attachment is completely self-contained and is easily mounted in position on the bed of the usual turret lathe and requires only a single mechanical coupling to the tool carriage. Further, the attachment is easily set up by unskilled labor for proper operation, which merely requires a knowledge of which dog to select for a particular machining operation and where to locate it on the control drum. Finally, if manual operation of the turret lathe is temporarily required, only the coupling 36 need be decoupled without removing the automating attachment, and full manual operation is immediately restored. Thus, the attachment in no way interferes with the normal operation of the turret lathe, but, when needed, enhances that operation by making possible production rates as much as three or four times greater than was possible by manual operation.

While the invention was described with particular reference to a turret lathe, it will be evident that it is applicable to any kind of machine tool containing an indexing turret and requiring different but controllable feeds for the various tools. Not only will it provide the fast-slow forward and fast return strokes, but by the provision of several dogs in each drum slot, it is possible to obtain fast-slow-fast forward and slow-fast return strokes, which would be useful for special boring jobs. It will be obvious that any desired pattern of feed rates is obtainable. Further, the invention can also be used as an attachment for automating the work feed or device in a milling machine to provide, for example, different feed rates during the cutting operation. Moreover, we do not wish to be confined to the specific details of construction and arrangement illustrated and described since modifications may be made therein without departing from the spirit and scope of the invention as defined in the appended claims.

What is claimed is:

1. A fluid metering valve for a hydraulically-operating automating attachment for a machine tool, comprising a housing having a fluid inlet and outlet communicating internally via a central passageway, means within the housing for directing incoming fluid into the said passageway from substantially diametrically opposed portions, a spool member having a tapered surface opposed to the said diametrically opposed portions and movable axially within the passageway from a full-flow position wherein the passageway is relatively unrestricted to a reduced-flow position wherein the passageway is substantially restricted, a first axially-movable follower member coupled to one end of the spool member for moving it from the full-flow to the reduced-flow position, and a second rotatable follower coupled to the opposite end of the spool member for returning same to the full-flow position.

2. A valve as set forth in claim 1, wherein a solenoid is connected to the opposite end of the spool member, and a microswitch connected to energize the solenoid is adapted to respond to movements of the second follower.

3. A valve as set forth in claim 2, wherein the first and second followers are each adapted to actuate the spool member only when actuated in one of opposite directions transverse to the direction of movement of the spool member.

4. A valve as set forth in claim 1, wherein the spool member is freely movable between its full-flow and reduced-flow positions.

5. A fluid metering valve for a hydraulically-operating automating attachment for a machine tool, comprising a housing having a fluid inlet and outlet communicating internally via a central passageway, means within the housing for directing incoming fluid into the said passageway from substantially diametrically opposed portions, a spool member having a tapered surface opposed to the said diametrically opposed portions and movable axially within the passageway between a full-flow position wherein the passageway is relatively unrestricted and a reduced-flow position wherein the passageway is substantially restricted, first means operative to move the spool to a reduced-flow position when engaged from one direction, second means operative to move the spool to a full-flow position when engaged from a direction opposite to said one direction, and means for rendering the first means inoperable when engaged from the said opposite direction.

6. A fluid metering valve for a hydraulically-operating automating attachment for a machine tool, comprising a housing having a fluid inlet and outlet communicating internally via a central passageway, means within the housing for directing incoming fluid into the said passageway from substantially diametrically opposed portions, a freely-movable spool member having a tapered surface opposed to the said diametrically opposed portions and movable axially within the passageway between a full-flow position wherein the passageway is relatively unrestricted and a reduced-flow position wherein the passageway is substantially restricted, first means coupled to one end of the spool member and operative to move the spool to a reduced-flow position when engaged from one direction, second means including circuit means coupled to the opposite end of the spool member and operative to move the spool to a full-flow position when engaged from the said one and from a direction opposite to said one direction, and mechanical means associated with the first means for rendering the first means inoperable when engaged from the said opposite direction.

7. A fluid metering valve as set forth in claim 6 wherein the mechanical means comprises an element mounted to be pivoted when engaged from said opposite direction but not from said one direction, and the circuit means includes a microswitch energized solenoid.

8. An automating attachment for a machine tool having an advancing and returning reciprocable member, comprising fluid-pressure establishing means, fluid-pressure actuated means coupled to the pressure establishing means and the reciprocable member for advancing and returning the latter, fluid-pressure control means connected between the pressure establishing means and the pressure actuated means for controlling the pressure applied to the latter and thus the rate at which the reciprocable member is advanced and returned, said control means including a pressure-regulating spool member in the fluid path and movable along a given path between a higher-pressure location and a lower-pressure location, said control means further including first follower means coupled to the spool member and operative to move it from a higher-pressure location to a lower-pressure location and second follower means coupled to the spool member and operative to move it from a lower-pressure location to the higher-pressure location, and actuating means for the control means, said actuating means being connected to and movable with the reciprocable member and including at least one adjustable dog member having a first cam portion position to engage and actuate the first follower means at a selected point during the advance of the reciprocable member and a second cam portion positioned to actuate the second follower means, means for rendering the first follower means inoperative to move the spool during the return of the reciprocable member, and means for rendering the second follower means inoperative to actuate the spool member during the advance of the reciprocable member, said first cam portion having a dimension operative to position the spool member at a location establishing a preselected fluid pressure and preselected rate of advance of the reciprocable member.

9. An automating attachment as set forth in claim 8 wherein the height of the dog member is the dimension establishing the selected rate of advance.

10. An attachment as set forth in claim 8 wherein the fluid-pressure control means comprises a single metering valve with two independent cam followers each separately actuable, one of said followers having a pivotable end and being directly coupled to one end of the spool member, the other follower being pivotable and being coupled via a switch and a solenoid to the other end of the spool member.

11. An automating attachment for a machine tool having an advancing and returning reciprocable member, comprising fluid-pressure establishing means, fluid-pressure actuated means coupled to the pressure establishing means and the reciprocable member for advancing and returning the latter, fluid-pressure control means connected between the pressure establishing means and the pressure actuated means for controlling the pressure applied to the latter and thus the rate at which the reciprocable member is advanced and returned, said control means including a pressure-regulating spool member in the fluid path and movable along a given path between a higher-pressure location and a lower-pressure location, said control means further including first follower means coupled to one end of the spool member and operative to move it from a higher-pressure location to a lower-pressure location and second follower means coupled to the opposite end of the spool member and operative to move it from the lower-pressure location to a higher-pressure location, and actuating means for the control means, said actuating means being connected to and movable with the reciprocable member and including at least one adjustable dog having a first cam portion positioned to engage temporarily and actuate the first follower means at a selected point during its advance and then become disengaged and a second cam portion positioned to engage and actuate the second follower means at a selected point during its return, means for rendering the first follower means inoperative to move the spool during the return of the actuating means, means for rendering the second follower means inoperative to actuate the spool member during the advance of the actuating means, said first cam portion having a dimension operative to locate the spool member at a location establishing a preselected fluid pressure and preselected rate of advance of the reciprocable member, and means for maintaining the spool member in the position established when said first and second cam portions actuate the first and second follower means, respectively.

12. An attachment as set forth in claim 11 wherein the dog means comprises an adjustable member having an upper cam portion whose preselected height determines the lower pressure valve, and a side cam portion whose position determines when the higher pressure is restored during the return stroke.

13. An attachment as set forth in claim 12 wherein the side cam portion comprises a pin.

14. An attachment as set forth in claim 12 wherein the side cam portion comprises a cam wedge.

15. An automating attachment for a machine tool having a multi-station turret on a reciprocable member adapted to advance and return along an axial path and including an indexing mechanism for indexing the turret during successive strokes of the said reciprocable member, comprising fluid-pressure establishing means, fluid-pressure actuated means coupled to the pressure establishing means and the said reciprocable member for advancing and returning same, a single fluid-pressure controlling metering valve connected between the pressure establishing means and the pressure actuated means for controlling the rate at which the said member is advanced and returned, a drum member connected to and movable with the said advancing and returning reciprocable member and rotated by the indexing mechanism when the turret is indexed, plural dogs mounted and axially adjustable on the drum to be successively presented to the metering valve for actuating same to control the advance and return of the turret for each of its stations, several of said dogs each comprising a first cam portion for actuating the metering valve only during the advance stroke and on the same dog a second cam portion for actuating the metering valve only during the return stroke, said metering valve including a movable spool member in the fluid path for controlling the fluid pressure, first means coupled to the spool member for actuating same and operative to be actuated by the first cam portion to move the spool member only during the forward stroke, second means coupled to the spool member for actuating same and operative to be actuated by the second cam portion to move the spool member only during the return stroke, and means for maintaining the spool member in the pressure condition established by the first and second means when actuated by a dog.

16. An automating attachment for a machine tool having a multi-station turret on a reciprocable member adapted to advance and return along an axial path and including an indexing mechanism for indexing the turret during successive strokes of the said reciprocable member, comprising fluid-pressure establishing means, fluid-pressure actuated means coupled to the pressure establishing means and the said reciprocable member for advancing and returning same, a single fluid-pressure controlling metering valve connected between the pressure establishing means and the pressure actuated means for controlling the rate at which the said reciprocable member is advanced and returned, a drum member connected to and movable with the said advancing and returning member and rotated by the indexing mechanism when the turret is indexed, and plural dogs mounted and axially adjustable on the drum to be successively presented to the metering valve for actuating same to control the advance and return of the turret for each of its stations, several of said dogs each comprising a first cam portion for actuating the metering valve only during the advance stroke and on the same dog a second cam portion for actuating the metering valve only during the return stroke, said metering valve including a movable spool member in the fluid path for controlling the fluid pressure, first means coupled to the spool member for actuating same from a high-pressure to a low-pressure position and operative to be actuated by the first cam portion only during the forward stroke at a selected point and to be rendered inoperable during the return stroke, second means coupled to the spool member for actuating same to restore the high-pressure position and operative to be actuated only by the second cam portion during the return stroke, and means for maintaining the spool member in the pressure condition provided by the first and second means, said first means being operative to locate the spool at a low-pressure position predetermined in accordance with a dimension of said first cam portion, said second cam portion being adapted to restore the high-pressure position at a preselected point during the return stroke.

17. An attachment as set forth in claim 16, wherein said second means includes a microswitch actuable only during the return stroke.

References Cited in the file of this patent

UNITED STATES PATENTS

| 2,531,896 | Telbizof | Nov. 28, 1950 |
| 2,562,266 | Gamble | July 31, 1951 |
| 2,580,122 | Parker | Dec. 25, 1951 |
| 2,642,649 | Shadrick | June 23, 1953 |
| 2,934,812 | Allen | May 3, 1960 |

FOREIGN PATENTS

| 194,036 | Great Britain | Mar. 8, 1923 |